United States Patent
Roy-Auberger et al.

(10) Patent No.: US 6,465,530 B2
(45) Date of Patent: Oct. 15, 2002

(54) PROCESS FOR SYNTHETIZING HYDROCARBONS IN THE PRESENCE OF A CATALYST COMPRISING A GROUP VIII METAL SUPPORTED ON SILICA-ALUMINA

(75) Inventors: Magalie Roy-Auberger, Rueil-Malmaison (FR); Philippe Courty, Villejuif (FR); Laurent Normand, Paris (FR); Roberto Zennaro, Venice (IT)

(73) Assignees: Institut Francais du Petrole, Rueil Malmaison Cedex (FR); AGIP Petroli S.p.A., Rome (IT); ENI S.p.A. division of AGIP, Rome (IT)

( * ) Notice: Subject to any disclaimer, the term of this patent is extended or adjusted under 35 U.S.C. 154(b) by 0 days.

(21) Appl. No.: 09/778,842

(22) Filed: Feb. 8, 2001

(65) Prior Publication Data

US 2002/0013375 A1 Jan. 31, 2002

(30) Foreign Application Priority Data

Feb. 8, 2000 (FR) .............................................. 0001618

(51) Int. Cl.[7] ........................... C07C 27/00; B01J 21/08; B01J 23/00; B01J 21/04

(52) U.S. Cl. ...................... 518/715; 518/700; 518/721; 502/263; 502/303; 502/439

(58) Field of Search ................................. 518/700, 715, 518/721; 502/263, 303, 439

(56) References Cited

U.S. PATENT DOCUMENTS 4,543,347 A * 9/1985 Heyward et al. ............. 502/61
4,594,468 A   6/1986 Minderhoud et al. ........ 585/310
5,104,902 A * 4/1992 Bessell ....................... 518/715

* cited by examiner

*Primary Examiner*—Jafar Parsa
(74) *Attorney, Agent, or Firm*—Millen, White, Zelano & Branigan, P.C.

(57) ABSTRACT

A process is described for synthetizing hydrocarbons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours such that said silica-alumina has a specific surface area of less than 260 $m^2/g$. Said catalyst is used in a fixed bed or in suspension in a liquid phase of a three-phase reactor.

22 Claims, No Drawings

PROCESS FOR SYNTHETIZING HYDROCARBONS IN THE PRESENCE OF A CATALYST COMPRISING A GROUP VIII METAL SUPPORTED ON SILICA-ALUMINA

The present invention relates to a process for synthetizing hydrocarbons from a mixture comprising CO—(CO$_2$)—H$_2$ (i.e., a mixture comprising carbon monoxide and hydrogen and possibly carbon dioxide, known as synthesis gas). This process comprises using a catalyst comprising at least one group VIII metal, preferably cobalt, supported on a silica-alumina, prepared by co-precipitating and calcining at a temperature in the range from about 500° C. to about 1200° C. for at least 6 hours, so as to have a specific surface area of less than 260 m$^2$/g.

PRIOR ART

The skilled person is aware that synthesis gas can be converted to hydrocarbons in the presence of a catalyst containing transition metals. Such conversion, carried out at high pressures and under pressure, is known in the literature as the Fischer-Tropsch synthesis. Metals from group VIII of the periodic table such as iron, ruthenium, cobalt and nickel catalyse the transformation of CO—(CO$_2$)—H$_2$ mixtures (i.e., a mixture of carbon monoxide, hydrogen and possibly carbon dioxide, known as synthesis gas) to liquid and/or gaseous hydrocarbons.

Different methods have been described and developed in the prior art that are intended to improve the preparation of Fischer-Tropsch catalysts based on cobalt supported on different supports. The most widely used supports are alumina, silica and titanium dioxide, occasionally modified by additional elements.

International patent WO-A-99/39825 describes the use of a support comprising a titanium dioxide base on which a binder constituted by silica and alumina has been incorporated. The mechanical properties of the catalyst obtained are improved, in particular for use in a three-phase reactor, generally known as a slurry reactor. Usually, such a reactor is of the slurry bubble column type.

WO-A-99/42214 describes adding a stabilising element to an Al$_2$O$_3$ support used to prepare a catalyst that is active in the Fischer-Tropsch process.

The stabiliser can be selected from the group formed by: Si, Zr, Cu, Mn, Ba, Co, Ni and/or La. It can substantially reduce the solubility of the support in acid or neutral aqueous solutions.

Cobalt-based Fischer-Tropsch catalysts described in the invention cited above and used in a three-phase reactor can lead to excessive losses of catalyst in the paraffin waxes produced, by the formation of submicronic fines. The catalyst losses, expressed with respect to the cobalt, can reach 50 mg of cobalt per kilogram of wax.

U.S. Pat. Nos. 5 169 821 and 5 397 806 describe including silicon, zirconium or tantalum in a cobalt-based catalyst supported on TiO$_2$ in the form of anatase to stabilise it to high temperature regeneration.

WO-A-96/19289 describes the use of a catalyst to convert synthesis gas to hydrocarbons based on cobalt, ruthenium or iron supported on a mesoporous crystalline aluminosilicate with a particular pore structure.

U.S. Pat. No. 4 497 903 describes incorporating cobalt into the crystalline layers of an aluminosilicate. The catalyst obtained is active on converting synthesis gas into liquid hydrocarbons principally constituted by branched hydrocarbons with a high octane number.

U.S. Pat. No. 5 045 519 describes a process for preparing silica-alumina leading to a high purity product that is heat stable. It is prepared by hydrolysis of an aluminium alkoxide and simultaneous or successive addition of orthosilicic acid previously purified by ion exchange. The silica-aluminas obtained are used as a support for a desulphurisation catalyst, in DeNO$_x$ catalysis, for oxidation, in hydrocracking, in mild hydrocracking, in automobile exhaust catalysis, and in isomerisation.

The present invention concerns a process for synthetizing hydrocarbons from a mixture comprising carbon monoxide and hydrogen, and possibly carbon monoxide, in the presence of a catalyst comprising at least one group VIII metal, preferably cobalt, supported on a particular silica-alumina which will be described below. The catalyst is preferably used in suspension in a liquid phase in a perfectly stirred autoclave type three-phase reactor or slurry bubble column. It is also suitable for use in a fixed bed.

The Applicant has discovered that using a silica-alumina support prepared by co-precipitating and calcining at a high temperature for a time sufficient to encourage interactions between the alumina and the silica (Al—O—Si bonds) can, after impregnation with at least one group VIII metal, preferably cobalt, produce a catalyst that is particularly active in a process for synthetizing hydrocarbons from a mixture comprising carbon monoxide and hydrogen. Further, said catalyst has improved mechanical properties, in particular when, as is preferable, it is used in suspension in a liquid phase in a three-phase reactor, and it has better resistance to attrition phenomena.

The silica-alumina used in the process of the present invention is preferably a silica-alumina that is homogeneous on the micrometric scale and in which the quantity of anionic impurities (for example SO$_4^{2-}$, Cl$^-$) and cationic impurities (for example Na$^+$) is preferably less than 0.1% by weight, more preferably less than 0.05% by weight.

The silica-alumina used in the process of the invention is prepared by co-precipitation. By way of example, the silica-alumina support used in the process of the invention can be prepared by true co-precipitation under controlled stationary operating conditions (average pH, concentration, temperature, mean residence time) by reacting a basic silicon-containing solution, for example in the form of sodium silicate, optionally aluminium, for example in the form of sodium aluminate, with an acidic solution containing at least one aluminium salt, for example aluminium sulphate.

After co-precipitation, the support is obtained by filtering and washing, optionally washing with an ammoniacal solution to extract the residual sodium by ion exchange, drying and forming, for example by spray drying then calcining, preferably in air in a rotary oven and at a high temperature, generally in the range about 500° C. to about 1200° C., for a time sufficient to encourage the formation of interactions between the alumina and the silica, generally at least 6 hours. These interactions lead to a better mechanical strength of the support and thus of the catalyst used in the process of the invention.

A further method for preparing the silica-alumina of the invention consists of preparing, from a water-soluble alkaline silicate, a solution of orthosilicic acid ($H_4SiO_4$, $H_2O$) decationised by ion exchange then mixed with a cationic aluminium salt in solution, for example the nitrate, and finally co-precipitating the solution obtained with ammonia under controlled operating conditions. After filtering and washing, drying with forming and calcining between about 500° C. and about 1200° C. for at least 6 hours, a silica-alumina support that can be used in the process of the invention is obtained.

A preferred method, disclosed in U.S. Pat. No. 5 045 519, consists of preparing a decationised orthosilicic acid as above then simultaneously or consecutively adding an aluminium alkoxide such as aluminium trihexanoate to the hydrolysed product. After intense homogenisation of the suspension by vigorous stirring, optional adjustment of the dry material content by filtering then re-homogenisation, the product is dried and formed, then calcined between about 500° C. and about 1200° C. for at least 6 hours.

In all of the preparation methods described, during any step of the preparation it may be desirable to add a small proportion of a stabilising element selected from the group formed by lanthanum, praseodymium and neodymium. The stabilising element is preferably added in the form of a soluble salt, for example a nitrate.

Preferably, a soluble salt of at least one stabilising element is added to the aqueous cationic aluminium salt or, as disclosed in U.S. Pat. No. 5 045 519, simultaneously or consecutively with addition of the orthosilicic acid to the hydrolysed product of at least one aluminium alkoxide.

The silica-alumina supports used in the present invention preferably contain between 0.5% and 30% by weight of silica, more preferably between 1% and 20% by weight, still more preferably between 1.4% and 15% by weight of silica with respect to the anhydrous product.

They can also contain 0.1% to 5% by weight, preferably 0.5% to 2% by weight, of at least one oxide $M_2O_3$ of at least one metal M selected from the group formed by lanthanum, praseodymium and neodymium.

The support is preferably formed into a fine calibrated powder with a grain size of 800 microns ($\mu$m) or less, preferably in the range 10 to 500 $\mu$m, more preferably in the range 10 to 300 $\mu$m, still more preferably in the range 20 to 150 $\mu$m, for optimum use in the presence of a liquid phase. The single drying-plus-forming step is preferably carried out by spray drying, to obtain substantially spherical microbeads with a size of less than about 800 $\mu$m.

After drying, the product is calcined, for example in air and in a rotary oven at a temperature in the range about 500° C. to about 1200° C., preferably in the range 550° C. to 1200° C., more preferably in the range 700° C. to 1200° C., highly preferably in the range 800° C. to 1100° C., and for a time sufficient to bring the specific surface area to less than 260 m$^2$/g, preferably less than 220 m$^2$/g, more preferably to a specific surface area in the range 130 to 200 m$^2$/g, and highly preferably in the range 130 to 190 m$^2$/g. Said calcining step generally lasts at least 6 hours, preferably at least 10 hours, more preferably at least 15 hours. As an example, said silica-alumina can be calcined for 12 hours at 1050° C.

It is also possible to commence calcining at low temperature, i.e., at a temperature in the range 350° C. to 550° C. for at least 1 hour, preferably at least 3 hours, then to raise the temperature to a temperature in the range about 500° C. to about 1200° C.

In a further implementation, the support is calcined firstly at 550° C. for three hours then treated in an air/$H_2O$ mixture at 800° C. for 24 hours, to obtain the desired specific surface area.

In a further variation, the support is in the form of spheres or extrudates with an equivalent diameter in the range 2 to 10 mm, for use in a fixed bed.

The catalyst supports for use in the process of the present invention have micronic homogeneity (i.e., on the micron scale), determined by microanalysis using a Castaing microprobe, such that the Si/Al atomic ratio, measured locally in several sections of the support particles, does not fluctuate by more that 20% around the mean value.

Preferably, the supports resulting in the catalysts used in the process of the invention have a "nanometric" homogeneity, i.e., on the nanometre scale.

One method that can be used to characterise the supports, and in particular to determine their homogeneity, is the transmission electron microscope (TEM). To this end, an electron microscope is used (JEOL 2010 or Philips Tecnai20F, with optional scanning) provided with an energy dispersion spectrometer (EDS) for X ray analysis (for example a Tracor or an Edax). The EDS detector must allow light element detection. The combination of these tools, TEM and EDS, combines imagery and local chemical analysis with good spatial resolution.

For this type of analysis, the samples are finely and ground in a mortar; the powder is then incorporated into a resin to produce ultrafine sections about 70 nanometres (nm) thick. These sections are collected on copper screens coated with an amorphous perforated carbon film, and acting as a support. They are then introduced into the microscope for observation and analysis under high vacuum. The image allows the sample zones to be readily distinguished from the resin zones. A certain number of analyses, a minimum of 10, preferably in the range 15 to 30, are then carried out on different zones of the incorporated sample. The diameter of the electron beam for analysing the zones (approximately determining the size of the analysed zones) is a maximum of 50 mm, preferably 20 nm, more preferably 10, 5, 2 or 1 nm in diameter. In scanning mode, the analysed zone will be a function of the size of the scanned zone and not the size of the beam, which is generally reduced.

Semi-quantitative treatment of the X ray spectra recovered using the EDS spectrometer can provide the relative concentration of Al and Si (in atomic %) and the ratio Si/Al for each of the zones analysed. The mean ratio, $Si/Al_m$, can be calculated, along with the standard deviation $\sigma$ of this set of measurements.

The process of the present invention uses catalysts wherein the relative standard deviation $\sigma$ (with respect to the value $Si/Al_m$) is less than 30%, preferably 20%, for an overall Si/Al that is preferably in the range 0.1 to 10. This overall ratio can be measured by other techniques that are routinely used for this type of analysis (X ray fluorescence, for example).

The catalyst used in the process of the invention is constituted by at least one element from group VIII (element selected from elements from groups 8, 9 and 10 in the new periodic table) supported on a silica-alumina with the characteristics described above, and prepared by co-precipitation.

The element from group VIII of the periodic table is preferably selected from iron, cobalt and ruthenium. More preferably, the group VIII metal is cobalt.

One technique for preparing the catalyst which is particularly suitable for carrying out the process of the invention is impregnation of an aqueous solution of a precursor of the metal from group VIII of the periodic table, preferably cobalt, for example an aqueous solution of salts such as cobalt nitrates. The weight content of the group VIII metal with respect to the total catalyst weight is generally in the range 0.1% to 50%, preferably in the range 1% to 30%.

The catalyst an also contain at least one additional element, for example an activity promoter, for example at least one element selected from the group formed by ruthenium, molybdenum and tantalum, or reducibility promoters such as platinum, palladium or ruthenium. The amount by weight of additional element with respect to the total catalyst weight is generally in the range 0.01% to 5%. These additional elements are preferably introduced at the same time as the group VIII metal or, in a preferred variation, in at least one subsequent step.

In a particular implementation of the invention, the catalyst contains both cobalt and ruthenium. In a further particular implementation of the invention, the catalyst contains cobalt and tantalum.

The mechanical strength of the catalyst of the invention is improved with respect to a catalyst comprising a support constituted solely by alumina or silica, or titanium dioxide.

The mechanical strength of the catalyst of the invention can be determined by measuring the change in the particle size at the end of a set test period during use of a three-phase reactor.

The catalysts so prepared result in particularly stable performances in Fischer-Tropsch synthesis and to a conversion of synthesis gas into a mixture of linear and saturated hydrocarbons containing at least 50% by weight of C5+ hydrocarbons and less than 20% of methane with respect to the total hydrocarbons formed.

The following conditions are normally employed for said catalysts when synthetizing hydrocarbons:

The catalyst comprising at least one group VIII metal impregnated on the silica-alumina support described above is dried then calcined. The catalyst is then pre-reduced using at least one reducing compound, for example selected from the group formed by hydrogen, carbon monoxide and formic acid, optionally mixed with an inert gas, for example nitrogen, in a reducing compound/(reducing compound+ inert gas) mole ratio in the range 0.001:1 to 1:1.

Reduction can be carried out in the gas phase at a temperature in the range 100° C. to 600° C., preferably in the range 150° C. to 400° C., at a pressure in the range 0.1 to 10 MPa and at an hourly space velocity in the range 100 to 40000 volumes of mixture per volume of catalyst per hour.

This reduction can also be carried out in the liquid phase, under the same operating conditions as in the gas phase, the catalyst then being suspended in an inert liquid phase (also known as the solvent), for example a paraffin cut comprising at least one hydrocarbon containing at least 5, preferably at least 10 carbon atoms per molecule.

When the catalyst is used in a three-phase reactor, it may be advantageous to use, as is preferable, the same inert solvent as that used during the reaction. Highly preferably, a paraffin cut from the Fischer-Tropsch process is used, for example a kerosene or diesel cut. Preferably, this reduction is carried out in situ, i.e., in the reactor that is then used to carry out the Fischer-Tropsch synthesis.

The catalyst used in the process of the invention can also be reduced ex situ or offsite, i.e., not in the Fischer-Tropsch synthesis reactor, or even outside the industrial site carrying out the process. Reduction can then optionally be carried out by an enterprise accustomed to carrying out offsite treatments.

In such a case, the catalyst is reduced under the operating conditions described above. After reducing and cooling the reduced catalyst to at least 100° C., said catalyst is preferably mixed, in an amount of 10% to 80% by weight, with solid paraffin waxes at ambient temperature and pre-heated to liquefy the waxes. Preferably, paraffin waxes from a Fischer-Tropsch process are used. After mixing, the suspension obtained is drop coagulated by projecting onto a support belt followed by cooling. The product obtained is in the form of grains with an equivalent diameter (diameter of the sphere with a equivalent volume) in the range about 5 to about 20 mm in diameter. These catalyst grains can be charged directly into the Fischer-Tropsch reactor.

The conversion of synthesis gas to hydrocarbons is then carried out under a total pressure that is normally in the range 0.1 to 15 MPa, preferably in the range 1 to 10 MPa; the temperature is generally in the range 150° C. to 350° C., preferably in the range 170° C. to 300° C. The hourly space velocity is normally in the range 100 to 20000 volumes of synthesis gas per volume of catalyst per hour ($h^{-1}$), preferably in the range 200 to 10000 $h^{-1}$, more preferably in the range 400 to 5000 $h^{-1}$, and the $H_2/CO$ ratio in the synthesis gas is normally in the range 1:2 to 5:1, preferably in the range 1.2:1 to 2.5:1.

The catalyst may be used in the form of a fine calibrated powder with a grain size of less than 800 microns ($\mu$m), preferably in the range 10 to 500 $\mu$m, more preferably in the range 10 to 300 $\mu$m, and highly preferably in the range 20 to 150 $\mu$m, most preferably in the range 20 to 120 $\mu$m, when it is used in suspension in a liquid phase. It can also be used in the form of particles with an equivalent diameter in the range about 2 to 10 mm, preferably in the range 3 to 8 mm, when used in a fixed bed.

The process of the present invention can be used with said catalyst disposed in a fixed bed. In such a process, the reaction takes place in the gas phase. The mechanical strength of the catalyst described above is sufficiently high for it to be manipulated and charged into such a reactor without risk of disintegration. The process of the invention can also, as is preferable, be carried out in a three-phase reactor in which the catalyst is in suspension in an inert liquid phase (solvent). As an example, a perfectly stirred reactor such as an autoclave or a bubble column type three-phase reactor (also known as a slurry bubble column) can be used.

The catalyst is advantageously used in a three-phase reactor, preferably a slurry bubble column, as this type of operation enables:

optimum use of the performances of the catalyst (activity and selectivity), by limiting intra-granular diffusion phenomena;

substantial limitation of thermal effects in the catalyst grain, which is surrounded by a liquid phase.

This type of implementation requires that the catalyst and reaction products be separated.

Under these conditions, the catalyst used in the process of the invention has improved mechanical properties, which leads to optimum separation of the catalyst and products, and an improved service life. Said catalyst has an improved attrition resistance, and thus a substantial reduction in the amount of fines formed during use with a three-phase reactor. One possible explanation for this improvement is the presence of more substantial and a greater number of interactions between the alumina and the silica in the silica-alumina prepared by co-precipitation.

In summary, the invention concerns a process for synthetizing hydrocarbons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours such that said silica-alumina has a specific surface area of less than 260 $m^2/g$.

In a preferred implementation, the silica-alumina is calcined at a temperature in the range 700° C. to 1200° C. for at least 10 hours. In a further preferred implementation, the silica-alumina is initially calcined at a temperature in the range about 350° C. to about 550° C. for at least 1 hour, then at a temperature in the range about 500° C. to about 1200° C. for at least 6 hours.

Preferably, the silica-alumina is homogeneous on the micrometre scale, and more preferably, the amount of anionic and cationic impurities is less than 0.1% by weight.

Preferably, the silica-alumina contains 0.5% to 30% by weight of silica with respect to the anhydrous product, and the group VIII metal content is in the range 0.1% to 50% by weight. The group VIII metal is preferably cobalt.

The catalyst for the process of the invention can optionally also contain at least one additional element selected from the group formed by: ruthenium, molybdenum, tantalum, platinum and palladium. It can also contain 0.1% to 5% by weight of at least one oxide $M_2O_3$ of at least one metal M selected from the group formed by lanthanum, praseodymium and neodymium.

Preferably, the catalyst is used in suspension in a liquid phase, in a three-phase reactor, generally in the form of a powder with a grain size of less than 800 microns. Said catalyst can, however, be used in a fixed bed in the form of particles with an equivalent diameter in the range 2 to 10 mm.

The following examples illustrate the invention.

EXAMPLE 1 (in accordance with the invention)

Catalyst A

Catalyst A, $Co/SiO_2$—$Al_2O_3$, was prepared by impregnating cobalt nitrate into a silica-alumina powder. The silica-alumina was first prepared by co-precipitation of sodium silicate, sodium aluminate, aluminium sulphate and sulphuric acid so as to obtain a final composition with $SiO_2/Al_2O_3$=5/95, and a specific surface area of 220 $m^2/g$ after calcining for 6 hours at 600° C. The suspension obtained was spray dried and the support obtained was in the form of microbeads with a grain size in the range 20 to 150 microns.

The catalyst from the impregnation step was dried and calcined at 400° C. for 2 hours.

The cobalt metal content was 13% by weight.

EXAMPLE 2 (in accordance with the invention)

Catalyst B

Catalyst B, $Co/SiO_2$—$Al_2O_3$, was prepared by impregnating cobalt nitrate into a silica-alumina prepared by co-precipitation of a mixture of silicic acid $H_2SiO_4$ and aluminium nitrate, to which ammonia had been added. After atomisation, the support obtained is in the form of microbeads of 40 to 120 microns.

After calcining at 700° C. for 6 hours, the silica-alumina composition $SiO_2/Al_2O_3$ was 10/95 and the specific surface area was 170 $m^2/g$.

The catalyst from the impregnation step was dried and calcined at 400° C. for 2 hours.

The cobalt metal content was 12.5% by weight.

EXAMPLE 3 (in accordance with the invention)

Catalyst C

Catalyst C, $Co/SiO_2$—$Al_2O_3$, was prepared by impregnating cobalt nitrate into a siralox 5 type silica-alumina (sold by Condea) prepared by adding silicic acid to a hydrolysed aluminium alkoxide followed by atomisation. The support obtained was calcined at 1000° C. for 12 h, its specific surface area was 150 $m^2/g$ and its $SiO_2$ weight content was 5%.

The infrared spectrum of hydroxyl groups obtained after pelleting the support alone, and treating it under vacunm at 500° C. presents an infrared band at 3750 $cm^{-1}$, corresponding to Si—OH and additionaly a wide band between 3750 and 3725 $cm^{-1}$ of lower intensity related to Al—OH groups.

The catalyst from the impregnation step was dried and calcined at 400° C. for 2 hours.

The cobalt metal content was 12.5% by weight.

EXAMPLE 4 (in accordance with the invention)

Catalyst D

A catalyst D was prepared in the same manner as catalyst C; lanthanum nitrate was added at the same time as the silicic acid to obtain a catalyst containing 12% by weight of cobalt on a support constituted by 2% by weight of lanthanum oxide, 5% by weight of silica and 93% by weight of alumina. Its specific surface area was 145 m$^2$/g after calcining for 2 hours at 400° C.

EXAMPLE 5(comparative)

Catalyst E

A catalyst E, Co/Al$_2$O$_3$, was prepared by impregnating cobalt nitrate into a Puralox Scca 5–170 alumina powder with a specific surface area of 180 m$^2$/g. This support was in the form of microbeads with a grain size in the range 20 to 150 microns.

The catalyst from the impregnation step was dried and calcined at 400° C. for 2 hours.

The final cobalt metal content was 12.5% by weight.

EXAMPLE 6(comparative)

Catalyst F

Catalyst F was prepared using the following steps in succession:

1. Impregnation of TEOS (tetraethoxysilane) into microbeads of puralox scca 5–170 alumina with a specific surface area of 180 m$^2$/g, using the method described by B. BEGUIN, E. GARBOWSKI and M. PRIMET in "Journal of Catalysis", page 595, volume 127, 1991;
2. Calcining at 500° C. for 2 hours;
3. Impregnating with cobalt nitrate, drying and calcining at 400° C. for 2 hours.

Besides, the infrared spectrum of hydroxyl groups obtained after pelleting the modified support alone, and treating it under vacunm at 500° C., only shows a hydroxyl band at 3745 cm$^{-1}$ related to Si—OH groups, the bands related to hydroxyl groups on alumina at 3760, 3730, 3685 and 3580 cm$^{-1}$ have disappeared.

Catalyst F contained 13% by weight of cobalt and 3% by weight of silica on a support constituted by alumina.

EXAMPLE 7(comparative)

Catalyst G

Catalyst G, Co/SiO$_2$—Al$_2$O$_3$, was prepared by impregnating cobalt nitrate into a silica-alumina powder.

The silica-alumina was prepared by adding silicic acid to an alumina gel obtained by hydrolysis of an aluminium alkoxide.

The support obtained was calcined at 500° C. for 4 hours; its specific surface area was 410 m$^2$/g and it comprised 20% by weight of silica and 80% by weight of alumina.

The catalyst obtained after impregnating with the cobalt nitrate was dried then calcined at 400° C. for 2 hours.

The cobalt content of the catalyst was 13% by weight.

EXAMPLE 8

Catalytic tests in a fixed bed reactor

Catalysts A to F, the preparations of which were described in Examples 1 to 6, were tested in a gas phase fixed bed in a unit functioning continuously and operating with 20 cm$^3$ of catalyst. The catalysts were initially reduced in situ at 350° C. for 12 hours in a mixture of hydrogen and nitrogen containing 30% hydrogen, then for 12 hours in pure hydrogen.

The catalyst test conditions were as follows:

T, ° C.=220° C.;

Pressure=2 MPa;

hourly space velocity (HSV)=1500 h$^{-1}$;

H$_2$/CO mole ratio=2/1

TABLE 1

Conversion of synthesis gas into hydrocarbons

| Catalyst | CO conv (% vol after 100 h) | Distribution of products formed (weight %) | |
|---|---|---|---|
| | | C1 | C5+ |
| A (invention) | 65 | 12 | 77 |
| B (invention) | 65 | 13 | 75 |
| C (invention) | 62 | 10 | 76 |
| D (invention) | 62 | 9 | 79 |
| E (comparative) | 68 | 16 | 54 |
| F (comparative) | 68 | 21 | 64.5 |

The results of Table 1 show that the selectivity of the process of the invention, in the presence of catalyst A, B, C or D supported on an amorphous silica-alumina, is improved for heavy products for a substantially equivalent conversion.

EXAMPLE 9

Catalytic tests in a three-phase reactor

Catalysts A to G described in Examples 1 to 8 above were tested in a perfectly stirred three-phase reactor functioning continuously and operating with a concentration of 10% (molar) of catalyst in suspension.

The catalyst test conditions were as follows:

T, ° C.=230° C.;

Pressure=2 MPa;

hourly space velocity (HSV)=1000 h$^{-1}$;

H$_2$/CO mole ratio=2/1

TABLE 2

Conversion of synthesis gas into hydrocarbons

| Catalyst | CO conv (% vol after 100 h) | Distribution of products formed (weight %) | |
|---|---|---|---|
| | | C1 | C5+ |
| A (invention) | 55 | 9 | 78 |
| B (invention) | 55 | 10 | 77 |
| C (invention) | 53 | 9 | 77 |
| D (invention) | 53 | 8 | 77 |
| E (comparative) | 50 | 11 | 64 |
| F (comparative) | 49 | 12 | 66 |
| G (comparative) | 50 | 15 | 63 |

The results of Table 2 show that the catalysts of the invention (A to D) have improved conversion and selectivity for heavy products with respect to comparative catalysts E, F and G.

After 500 hours of test, the mechanical strength of catalysts A to F were evaluated by measuring the grain size of the catalysts obtained after separating the reaction products.

Table 3 below shows the % of catalyst particles with a size of less than 20 microns formed when testing catalysts A to G.

TABLE 3

Attrition resistance

| Catalyst | % of particles less than 20 microns |
| --- | --- |
| A (invention) | 5 |
| B (invention) | 3 |
| C (invention) | 4 |
| D (invention) | 4 |
| E (comparative) | 10 |
| F (comparative) | 9 |
| G (comparative) | 9 |

The mechanical strength of the catalysts used in the process of the invention (A to D) was substantially higher compared with catalysts E, F and G.

EXAMPLE 10

Catalysts A and E described in Examples 1 and 5 above were used in an apparatus comprising:
- a slurry bubble column with an internal diameter of 50 mm and a height of 1500 mm;
- a synthesis gas inlet pipe at the base of the column;
- a suspension withdrawal pipe above the liquid level;
- a suspension re-injection pipe at the base of the column;
- a circulation loop comprising a degasser, a settler and a pump.

Catalyst A, introduced into the column in an amount of 500 g in 1.5 l of n-C18 paraffin, was used under the following conditions:

Feed flow rate: 1 $m^3/h$ of a $CO:H_2$ mixture (mole ratio 1:2);
T=220° C.;
P=2 MPa.

The CO conversion was 72%; the C5+ selectivity was 77% by weight. The catalyst was separated from the products using a settler; the catalyst content in the liquid was less than 250 ppm by weight, i.e., about 33 ppm of cobalt, which required very simple filtration, without the need for recycling the very small quantities of catalyst filtered towards the reactor.

Catalyst E, used under the same conditions as those used for A, produced a CO conversion of 65% and a C5+ selectivity of 76%. Settling in the same apparatus left 0.15% by weight of catalyst in the liquid, i.e., about 180 ppm of cobalt, which necessitated a subsequent more complex filtration and recycling of the separated catalyst to the reactor.

The process of the invention carried out using catalyst A thus led to improved performances and easier separation of the catalyst with respect to catalyst E, with no substantial loss of cobalt.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/01.618, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for synthesizing hydrocarbons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours such that said silica-alumina has a specific surface area of less than 260 $m^2/g$.

2. A process according to claim 1, in which the silica-alumina is calcined at a temperature in the range 700° C. to 1200° C. for at least 10 hours.

3. A process according to claim 1, in which the silica-alumina is initially calcined at a temperature in the range about 350° C. to about 550° C. for at least 1 hour, then at a temperature in the range about 500° C. to about 1200° C. for at least 6 hours.

4. A process according to claim 1, in which the silica-alumina is homogeneous on a nanometer scale.

5. A process according to claim 1, in which the amount of anionic and cationic impurities is less than 0.1% by weight.

6. A process according to claim 1, in which the silica-alumina contains in the range 0.5% to 30% by weight of silica with respect to the anhydrous product.

7. A process according to claim 1, in which the group VIII metal content is in the range 0.1% to 50% by weight.

8. A process according to claim 1, in which the group VIII metal is cobalt.

9. A process according to claim 1, in which the catalyst contains at least one additional element selected from the group formed by: ruthenium, molybdenum, tantalum, platinum and palladium.

10. A process according to claim 1, in which the catalyst further contains 0.1% to 5% by weight of at least one oxide $M_2O_3$ of at least one metal M selected from the group formed by lanthanum, praseodymium and neodymium.

11. A process according to claim 1, in which the catalyst is used in suspension in a liquid phase, in a three-phase reactor.

12. A process according to claim 11, in which said catalyst is in the form of a powder with a grain size of less than 800 microns.

13. A process according to claim 1, in which the catalyst is used in a fixed bed in the form of particles with an equivalent diameter in the range 2 to 10 mm.

14. A process according to claim 1, in which the silica-alumina contains 1 to 20% by weight of silica on an anhydrous basis.

15. A process according to claim 1, in which the silica-alumina contains 1.4 to 15% by weight of silica on an anhydrous basis.

16. A process according to claim 1, wherein the specific surface area is less than 220 $m^2/g$.

17. A process according to claim 1, wherein the specific surface area is 130 to 200 $m^2/g$.

18. A process according to claim 1, wherein the specific surface area is 130 to about 170 $m^2/g$.

19. A process according to claim 1, wherein the coprecipitation was from an aqueous solution of sodium silicate, sodium aluminate, aluminum sulphate and sulfuric acid or from a mixture of silicic acid and aluminum nitrate to which ammonia was added or from a mixture of silicic acid and hydrolyzed aluminum oxide, followed by atomization.

20. A process according to claim 19, in which the silica-alumina contains 0.5% to 50% by weight of silica on an anhydrous basis.

21. A process according to claim 1, wherein after said coprecipitation, the resultant coprecipitate was directly filtered, washed, dried with forming and calcined in successive steps.

22. A process according to claim 19, wherein after said coprecipitation, the resultant coprecipitate was directly filtered, washed, dried with forming and calcined in successive steps.

* * * * *